(12) United States Patent
Sheets et al.

(10) Patent No.: US 9,754,258 B2
(45) Date of Patent: *Sep. 5, 2017

(54) SPEECH TRANSACTION PROCESSING (71) Applicant: Visa International Service Association, San Francisco, CA (US)

(72) Inventors: John F. Sheets, San Francisco, CA (US); Kim R. Wagner, Sunnyvale, CA (US); Mark A. Nelsen, Oakland, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/304,681

(22) Filed: Jun. 13, 2014

(65) Prior Publication Data

US 2014/0372128 A1  Dec. 18, 2014

Related U.S. Application Data (60) Provisional application No. 61/835,992, filed on Jun. 17, 2013.

(51) Int. Cl.
*G10L 21/00* (2013.01)
*G06Q 20/40* (2012.01)
(Continued)

(52) U.S. Cl.
CPC ....... *G06Q 20/40145* (2013.01); *G06F 21/32* (2013.01); *G06F 21/83* (2013.01); *G06Q 20/20* (2013.01); *G10L 17/22* (2013.01); *G06F 2221/2111* (2013.01); *G06F 2221/2117* (2013.01); *G10L 17/10* (2013.01)

(58) Field of Classification Search
USPC ................. 704/246, 247, 251, 252, 273–275
See application file for complete search history.

(56) References Cited

U.S. PATENT DOCUMENTS 6,868,381 B1 * 3/2005 Peters ................... G10L 15/065
704/231
7,698,566 B1    4/2010 Stone
(Continued)

FOREIGN PATENT DOCUMENTS

EP   2437477 A1   4/2012

OTHER PUBLICATIONS

Extended European Search Report dated Jun. 28, 2016, Application No. 14813144.4, 13 pages.
(Continued)

*Primary Examiner* — Leonard Saint Cyr
(74) *Attorney, Agent, or Firm* — Kilpatrick Townsend & Stockton LLP (57) ABSTRACT

Embodiments of the invention are directed to systems and methods for speech transaction processing. A location of a device associated with a user may be determined. A reference to a voice model associated with the user stored within a database may be retrieved, based at least in part on the location. A voice segment may be received from the user. Using the reference, the voice segment may be compared to the voice model stored within the database. A determination may be made whether the user is authenticated for the transaction based on the comparing step.

14 Claims, 8 Drawing Sheets

(51) Int. Cl.
*G10L 17/22* (2013.01)
*G06Q 20/20* (2012.01)
*G06F 21/32* (2013.01)
*G06F 21/83* (2013.01)
*G10L 17/10* (2013.01)

(56) References Cited

U.S. PATENT DOCUMENTS

| | | |
|---|---|---|
| 8,438,066 B1 | 5/2013 | Yuen et al. |
| 8,694,315 B1* | 4/2014 | Sheets et al. ............. 704/246 |
| 8,805,737 B1* | 8/2014 | Chen et al. ............... 705/38 |
| 8,831,957 B2* | 9/2014 | Taubman ......... H04M 1/72572 379/88.01 |
| 2002/0190124 A1 | 12/2002 | Piotrowski |
| 2003/0046237 A1* | 3/2003 | Uberti ....................... 705/44 |
| 2003/0125947 A1* | 7/2003 | Yudkowsky ........... G10L 17/00 704/247 |
| 2003/0182119 A1 | 9/2003 | Junqua |
| 2005/0125296 A1* | 6/2005 | Tidwell et al. ............ 705/16 |
| 2005/0125337 A1* | 6/2005 | Tidwell et al. ............ 705/39 |
| 2006/0248019 A1 | 11/2006 | Rajakumar |
| 2007/0106517 A1 | 5/2007 | Cluff |
| 2008/0255843 A1* | 10/2008 | Sun ....................... G10L 15/142 704/250 |
| 2009/0006093 A1 | 1/2009 | Das |
| 2011/0071831 A1 | 3/2011 | Garcia |
| 2011/0276478 A1 | 11/2011 | Hirson et al. |
| 2012/0265585 A1 | 10/2012 | Muirbrook et al. |
| 2013/0066749 A1 | 3/2013 | Cooke et al. |
| 2014/0012689 A1 | 1/2014 | Henderson et al. |

OTHER PUBLICATIONS

International Search Report and Written Opinion for International Patent Application No. PCT/US2014/042538, mailed on Oct. 7, 2014, 11 pages.

* cited by examiner

SPEECH TRANSACTION PROCESSING

CROSS-REFERENCES TO RELATED APPLICATIONS

The present application is a non-provisional application of and claims priority to U.S. Provisional Application No. 61/835,992 titled "SPEECH TRANSACTION PROCESSING" filed on Jun. 17, 2013, the entire contents of which are herein incorporated by reference for all purposes.

BACKGROUND

Embodiments of the invention are directed to systems and methods that allow for user verification at point-of-sale (POS) terminals. A number of instances exist where a user may wish to complete a transaction with their mobile device at a point-of-sale terminal. In some cases, verification of the user may be accomplished by, e.g., the use of a personal identification number (PIN) assigned to the user. However, PINs are often comprised. As such, the effectiveness of PINs as a security safeguard and for user verification is greatly reduced. Additionally the user's trust and comfort with the verification system may be diminished as a result.

Embodiments of the invention address this and other problems, both individually and collectively.

SUMMARY

Embodiments of the invention are directed to systems and methods for authenticating a user for a transaction. More specifically, embodiments of the invention relate to systems and methods for determining when a user is within a specified location and obtaining a reference for accessing a voice model associated with the user from a database. The reference to the voice model may then be used to authenticate the user by comparing a received voice segment to the voice model. Because a user's voice and speech patterns can be unique to the user, it would be difficult for a fraudster to mimic someone else's voice to fraudulently conduct a transaction. As such, utilizing a user's voice to authenticate the user for a transaction can provide better security than other authentication techniques such as PINs that can easily be compromised.

Some aspects of the invention relate to techniques for increasing efficiency in searching databases. In some embodiments, these databases may store voice models for a plurality of users that can be used for voice authentication during initiation of a transaction. These databases can include thousands or millions of entries, which may take a significant amount of time to search. Upon the occurrence of an event, e.g. a user entering a merchant location, a reference to the voice model associated with the user that is stored within the database can be obtained. The reference can be a pointer to a location of the voice model within the database. The user can be identified based on attributes associated with his/her communication device (e.g., serial number, International Mobile Equipment Identity (IMEI) number, Subscriber Identity Module (SIM) card number, phone number, primary account number or token associated with a digital wallet application, etc.). The user may provide a voice segment (e.g., voice sample) at the time of initiating a transaction via the communication device. The provided voice segment may then be compared against the voice model associated with the user stored within the database, using the obtained reference. These techniques may eliminate or reduce the need or the time it takes to search the entire database(s) for the user's voice model at the point of transaction, as a reference to the voice model may have already been obtained at the occurrence of the event (e.g., the user entering the merchant location).

Some embodiments are directed to a method for authenticating a user for a transaction. The method includes receiving, at a server computer, a communication indicative of a location of a communication device associated with the user. The method also includes, in response to receiving the communication, retrieving, via the server computer, a reference for accessing a voice model associated with the user, wherein the voice model is stored in a database. The method further includes receiving, at the server computer, a voice segment from the user. The method additionally includes, using the reference to access the voice model stored in the database. The method also includes comparing the received voice segment to the voice model. The method further includes determining whether the user is authenticated for the transaction based at least in part on comparing the received voice segment to the voice model.

Some embodiments of the invention are directed to a server computer comprising a processor, and a computer readable medium coupled to the processor. The computer readable medium comprises code, executable by the processor, for implementing the above-described method.

DETAILED DESCRIPTION

Prior to discussing the specific embodiments of the invention, a further description of some terms can be provided for a better understanding of embodiments of the invention.

A "payment device" may include any suitable device capable of making a payment transaction. For example, a payment device can include a card such as a credit card, debit card, charge card, gift card, or any combination thereof. As another example, a payment device can be a communication device that is used to conduct a payment transaction.

A "payment processing network" (e.g., VisaNet™) may include data processing subsystems, networks, and operations used to support and deliver payment related services (e.g., authentication services, authorization services, exception file services, and clearing and settlement services, etc.). An exemplary payment processing network may include VisaNet™. Payment processing networks such as VisaNet™ are able to process credit card transactions, debit card transactions, and other types of commercial transactions. VisaNet™ in particular, includes a VIP system (Visa Integrated Payments system) which processes authorization requests and a Base II system which performs clearing and settlement services.

A "server computer" can be a powerful computer or a cluster of computers. For example, the server computer can be a large mainframe, a minicomputer cluster, or a group of servers functioning as a unit. In one example, the server computer may be a database server coupled to a Web server, and may include or be coupled to a database.

An "access device" can be any suitable device configured to process payment transactions. For example, an access device (e.g., a point-of-sale (POS) terminal, etc.) can be used to process payment transactions such as credit card or debit card transactions, or electronic settlement transactions, and may have optical, electrical, or magnetic readers for reading data from other portable communication devices such as smart cards, keychain device, cell phones, payment cards, security cards, access cards, and the like.

An "acquirer" can be a business entity (e.g., a commercial bank) that typically has a business relationship with a merchant. An acquirer may receive some or all of the transactions from that merchant.

An "issuer" can be a business entity which issues a payment account that can be used to conduct transactions. Typically, an issuer is a financial institution.

An "account holder" can be a user who is authorized to conduct transactions with a payment account. The account holder can be, for example, the account owner of the account associated with a payment device, or an individual who is authorized to use the account on behalf of the account owner. The terms "account holder" and "user" may be used interchangeably in the following description.

A "communication device," as described herein, can be any electronic communication device that can execute and/or support electronic communications including, but not limited to, payment transactions. Some examples include a personal digital assistant (PDA), a smart phone, tablet computer, notebook computer, and the like.

An "authorization request message" may be an electronic message that is sent to request authorization for a transaction. An authorization request message can be sent, for example, to a payment processing network and/or an issuer of a payment device. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. An authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a issuer bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

As used herein, a "communications channel" may refer to any suitable path for communication between two or more entities. Suitable communications channels may be present directly between two entities such as a payment processing network and a merchant or issuer computer, or may include a number of different entities. Any suitable communications protocols may be used for generating a communications channel. A communication channel may in some instance comprise a "secure communication channel," which may be established in any known manner, including the use of mutual authentication and a session key and establishment of a secure socket layer (SSL) session. However, any method of creating a secure channel may be used. By establishing a secure channel, sensitive information related to a payment device (such as account numbers, CVV values, expiration dates, etc.) may be securely transmitted between the two or more entities to facilitate a transaction.

A "digital wallet provider" may include any suitable entity that provides a digital wallet service. A digital wallet provider may provide software applications that store account numbers, account numbers including unique identifiers, or representations of the account numbers (e.g., tokens), on behalf of an account holder to facilitate payments at more than one unrelated merchant, perform person-to-person payments, or load financial value into the digital wallet.

"Biometric data" includes data that can be used to uniquely identify an individual based upon one or more intrinsic physical or behavioral traits. For example, biometric data may include fingerprint data and retinal scan data. Further examples of biometric data include digital photographic data (e.g., facial recognition data), deoxyribonucleic acid (DNA) data, palm print data, hand geometry data, and iris recognition data. In the context of the present disclosure, biometric data may include voice data.

"Speaker recognition" is the identification of a user based on characteristics of their voice (voice biometrics). Speaker recognition uses the acoustic features of speech that have been found to differ between individuals. These acoustic patterns reflect both anatomy (e.g., size and shape of the throat and mouth) and learned behavioral patterns (e.g., voice pitch, speaking style).

"Speech recognition" is the translation of spoken words into text understandable by a computer system. Speech recognition combined with speaker recognition may simplify the task of translating speech in systems that are used to authenticate or verify the identity of a speaker as part of a security process.

"Voice recognition" may be used to describe both "speaker recognition" and "speech recognition".

A "voice model," as described herein, can be a model of the user's voice constructed from prior voice samples received from the user. The voice model can be used to determine a risk factor associated with a user. The voice model may contain information about current and prior user authentications with a verification system. For example, the voice model may contain the time, location, voice data, and match score associated with each particular voice authentication with the verification system by the user. The combination of information within the voice model about prior authentications may be used to determine the risk factor associated with the user.

A "prompt," as described herein, can be a combination of a number of words arranged in a particular order. A user may be requested to repeat a prompt for authentication purposes. The terms "prompt" and "word string" may be used interchangeably in the following description.

A "voice sample," as described herein, can be captured audio data of a user's voice. For example, a voice sample may be a captured audio signal of a user's voice who wishes to authenticate with a transaction system. The user may be requested to repeat a certain prompt. The microphone may capture the prompt repeated by the user and pass the audio data to another module for speaker verification. The terms "voice sample," "voice data," "voice segment," and "audio segment" may be used interchangeably in the following description.

A "match score," as described herein, can be a relationship between received input data and stored data. In the context of the present disclosure, the received input data can be a captured voice sample. The stored data can be a previously captured and stored voice sample or the voice model. The match score may express the degree of confidence that the received input data and the stored data correlates with each other (e.g., originated from the same individual). The match score may be passed to other parts of a risk scoring mechanism, such that the match score contributes along with other risk parameters to an overall decision that may be used, for example, for approving or declining a transaction. An appropriate threshold can be set to ensure an acceptable level of accuracy. This concept can be applied to other biometric data apart from voice samples (e.g., retinal scans, facial recognition data, etc.).

I. Exemplary Systems

Figure 1:
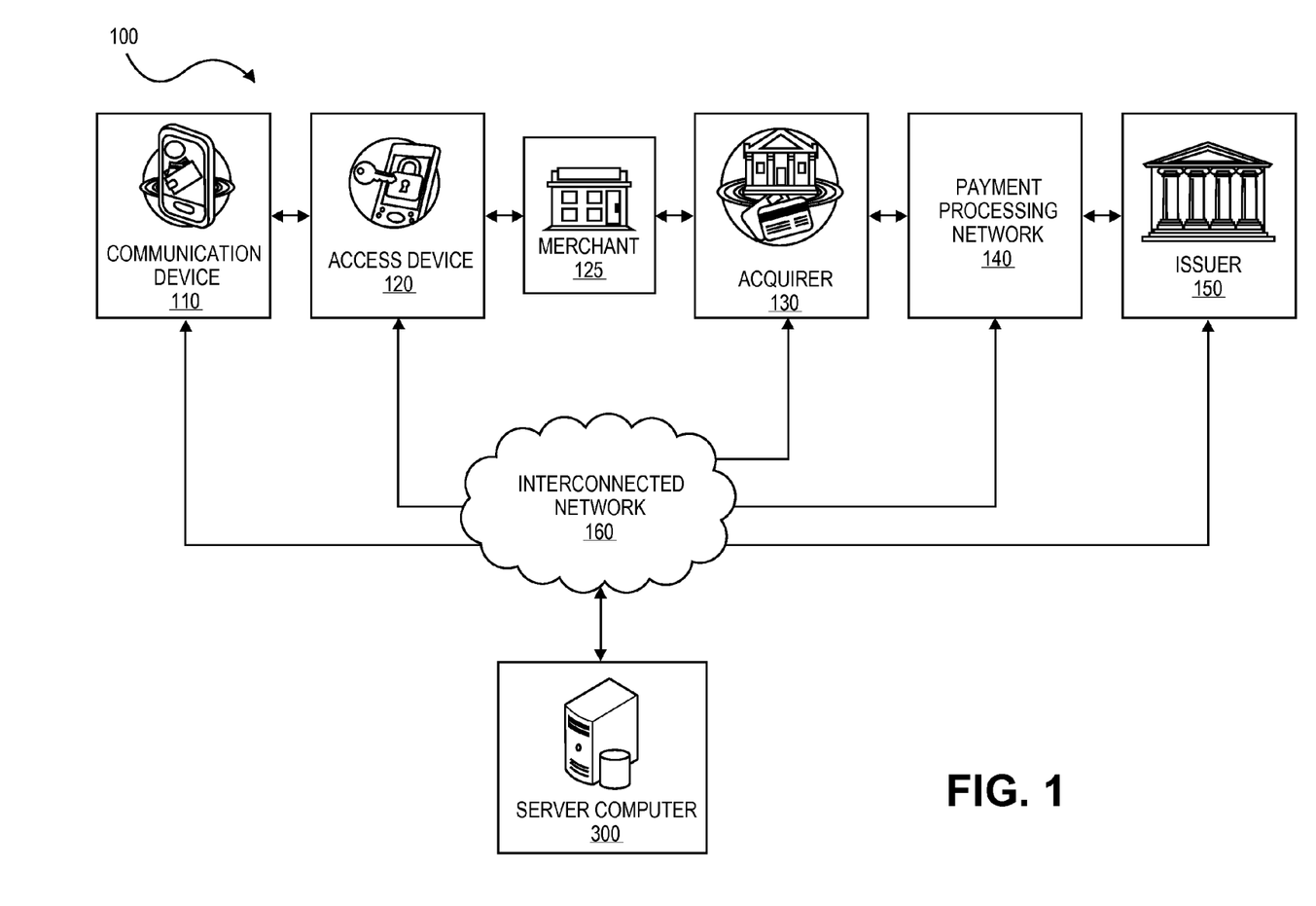
FIG. 1 is a block diagram of a payment system, according to some embodiments.

FIG. 1 is a block diagram of a payment system 100, according to some embodiments. The system 100 includes a communication device 110, an access device 120, a merchant 125, an acquirer 130, a payment processing network 140, an issuer 150, interconnected network 160, and a server computer 300. The acquirer 130 may further include an acquirer computer (not shown). The payment processing network 140 may include an authorization and settlement server and/or additional servers (not shown) to carry out the various transactions described herein. In some embodiments, the server computer 300 may reside within the payment processing network 140 or issuer 150.

In some embodiments, the communication device 110 may be in electronic communication with the access device 120. The communication device 110 can be a personal digital assistant (PDA), a smart phone, tablet computer, notebook computer, or the like, that can execute and/or support payment transactions with a payment system 100. A communication device 110 can be used in conjunction with a payment device, such as a credit card, debit card, charge card, gift card, or other payment device and/or any combination thereof. The combination of a payment device (e.g., credit card) and the communication device 110 (e.g., smart phone) can be referred to as the communication device 110 for illustrative purposes. In some embodiments, the communication device 110 may be used in conjunction with transactions of currency or points (e.g., points accumulated in a particular software application). In some embodiments, the communication device 110 may be a wireless device, a contactless device, a magnetic device, or other type of payment device. In some embodiments, the communication device 110 includes software (e.g., application) and/or hardware to perform the various payment transactions and capture user voice data as further described below.

The access device 120 may be configured to be in electronic communication with the acquirer 130 via a merchant 125. In one embodiment, the access device 120 may be a point-of-service (POS) device. Alternatively, the access device 120 can be any suitable device configured to process payment transactions such as credit card or debit card transactions, or electronic settlement transactions, and may have optical, electrical, or magnetic readers for reading data from portable electronic communication devices such as smart cards, keychain device, cell phones, payment cards, security cards, access cards, and the like. In some embodiments, the access device 120 may be located at and controlled by a merchant. For example, the access device 120 can be a POS device at a grocery store checkout line. In some embodiments, the access device 120 can be a client computer or a mobile phone in the event that the user is conducting a remote transaction.

The acquirer 130 (e.g., acquirer bank) may include an acquirer computer (not shown). The acquirer computer can be configured to transfer data (e.g., bank identification number (BIN), etc.) and financial information to the payment processing network 140. In some embodiments, the acquirer 130 does not need to be present in the system 100 for the communication device 110 to transfer the financial and user data to the payment processing network 140. In one non-limiting example, the acquiring bank 130 can additionally check the credentials of the user against a watch list in order to prevent fraud and money laundering schemes.

In some embodiments, the payment processing network 140 is VisaNet™, where Visa internal processing (VIP) performs the various payment processing network 140 or multi-lateral switch functions described herein. The payment processing network 140 can include an authorization and settlement server (not shown). The authorization and settlement server ("authorization server") performs payment authorization functions. The authorization server is further configured to send and receive authorization data to the issuer 150. Furthermore, the payment processing network 140 can receive a voice sample by the user (e.g., from the payment device 110, access device 120, or acquirer 130) to determine a risk factor associated with a transaction, as further described below.

In some embodiments, the issuer 150 is a business entity which issues a card to a card holder. Typically, an issuer is a financial institution. The issuer 150 is configured to receive the authorization data from the payment processing network 140 (e.g., the authorization server). The issuer 150 receives authentication data from the authorization server and determines if the user is authorized to perform a given financial transaction (e.g., cash deposit/withdrawal, money transfer, balance inquiry) based on whether the user was authenticated by an identification system.

In some embodiments, the communication device 110 may be connected to and communicate with the payment processor network 140 via an interconnected network 160. One example of an interconnected network 160 is the Internet. The payment processor network 140 may inform the communication device 110 when a payment has been successfully processed. In some embodiments, the payment processor network 140 may be connected to and communicate with the access device 120 via the interconnected network 160. The payment processor network 140 may inform the access device 120 when a payment has been successfully processed. In turn, the access device 120 may complete the transaction with the communication device 110.

A server computer 300 is also shown in FIG. 1, and is in operative communication with the interconnected network 160. The server computer 300 may include a voice database (described below) that includes stored voice model(s) of a user for authentication purposes. The voice model may be created for the user at the time of enrollment with the authentication system. The voice model may subsequently be updated over time as additional voice samples are captured during subsequent user authentications performed with the authentication system. In some embodiments, the voice database within the server computer 300 may include voice models for a large number of users. That is, the voice database may include thousands or millions of voice models. Further details regarding the voice database are provided below.

The interconnected network 160 may comprise one or more of a local area network, a wide area network, a metropolitan area network (MAN), an intranet, the Internet, a Public Land Mobile Network (PLMN), a telephone network, such as the Public Switched Telephone Network (PSTN) or a cellular telephone network (e.g., wireless Global System for Mobile Communications (GSM), wireless Code Division Multiple Access (CDMA), etc.), a VoIP network with mobile and/or fixed locations, a wireline network, or a combination of networks.

In a typical payment transaction in some embodiments, a user may interact with the access device 120 (e.g., with a payment device such as a payment card, communication device, or by entering payment information) to conduct a transaction with the merchant 125. The merchant 125 may operate a merchant computer, which may route an authorization request message to the acquirer 130, and eventually to the issuer 150 via the payment processing network 140.

The issuer 140 will then determine if the transaction is authorized (e.g., by checking for fraud and/or sufficient funds or credit). The issuer will then transmit an authorization response message to the terminal 120 via the payment processing network 140 and the acquirer 130.

The transaction is cleared and settled between the acquirer 130 and the issuer 150 by the payment processing network 140, for example, at the end of the day.

The description below provides descriptions of other components in the system as well as authentication methods using authenticating a user for a transaction based on a received voice sample. The authentication methods can be performed at any suitable point during the above-described transaction flow.

Figure 2:
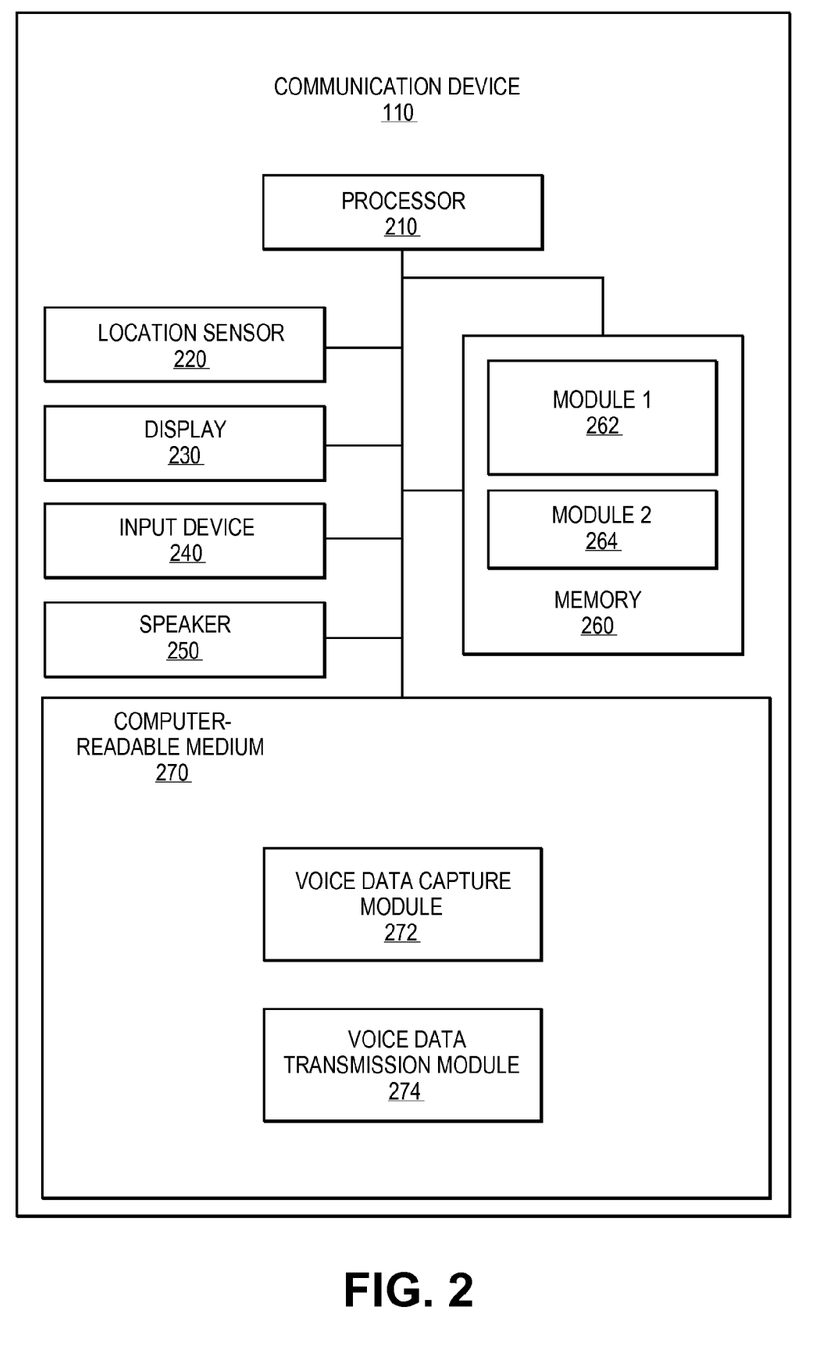
FIG. 2 is a block diagram of communication device, according to some embodiments.

FIG. 2 is a block diagram of a communication device 110, according to some embodiments. Communication device 110 includes a processor 210, a location sensor 220, a display 230, an input device 240, a speaker 250, a memory 260, and a computer-readable medium 270.

Processor 210 may be any suitable processor operable to carry out instructions on the communication device 110. The processor 210 is coupled to other units of the communication device 110 including location sensor 220, display 230, input device 240, speaker 250, memory 260, and computer-readable medium 270.

Location sensor 220 may be any sensor capable of obtaining location data associated with the communication device 110. The location sensor 220 may communicate with a mobile network associated with the communication device 110 or a Global Positioning System (GPS) (or other similar system) to obtain location data for the communication device 110. For example, location sensor 220 can be a GPS receiver, or a wireless communication antenna (e.g., cellular, WiFi, etc.) that can be used to triangulate the location of communication device 110. The location sensor may also be compatible with location-based services that make use of the obtained location data to control features and information services.

Display 230 may be any device that displays information to a user. Examples may include an LCD screen, CRT monitor, or seven-segment display.

Input device 240 may be any device that accepts input from a user. Examples may include a keyboard, keypad, mouse, or microphone. In the case of a microphone, the microphone may be any device that converts sound to an electric signal. In some embodiments, the microphone may be used to capture voice data from a user.

Speaker 250 may be any device that outputs sound to a user. Examples may include a built-in speaker or any other device that produces sound in response to an electrical audio signal. In some embodiments, speaker 250 may be used to request the user for a voice sample for purposes of authentication.

Memory 260 may be any magnetic, electronic, or optical memory. Memory 260 includes two memory modules, module 1 262 and module 2 264. It can be appreciated that memory 260 may include any number of memory modules. An example of memory 260 may be dynamic random access memory (DRAM).

Computer-readable medium 270 may be any magnetic, electronic, optical, or other computer-readable storage medium. Computer-readable storage medium 270 includes voice data capture module 272 and voice data transmission module 274. Computer-readable storage medium 270 may comprise any combination of volatile and/or non-volatile memory such as, for example, buffer memory, RAM, DRAM, ROM, flash, or any other suitable memory device, alone or in combination with other data storage devices.

Voice data capture module 272 is configured to capture voice data, via input device 240, from a user for voice authentication purposes. In some embodiments, voice data capture module 272 may capture voice data by the user for purposes of initially registering a user for the first time for subsequent voice authentication. In some embodiments, voice data capture module 272 may capture voice data, via input device 240, for purposes of authenticating a user in order to complete a transaction. For example, communication device 110 may request a user to register or authenticate his/her voice data by displaying a prompt, on display 230, to repeat (by speaking into the microphone) a specific prompt. In some embodiments, the prompt can also be outputted on speaker 250. Upon capturing the user's voice data via the microphone, the voice data corresponding to the prompted prompt may be transmitted to a server computer via voice data transmission module 274 for purposes of storing the voice data for future user authentication or for authenticating the user based on a stored voice model, described below. In some embodiments, the captured voice data can be digitized.

Voice data transmission module 274 is configured to transmit captured voice data to a server computer. In some embodiments, the captured voice data may be voice data captured during user registration and/or authentication by voice data capture module 272, described above. In some embodiments, the captured voice data may be voice data captured during subsequent authentications using voice data received from the user, described in further detail below.

Figure 3:
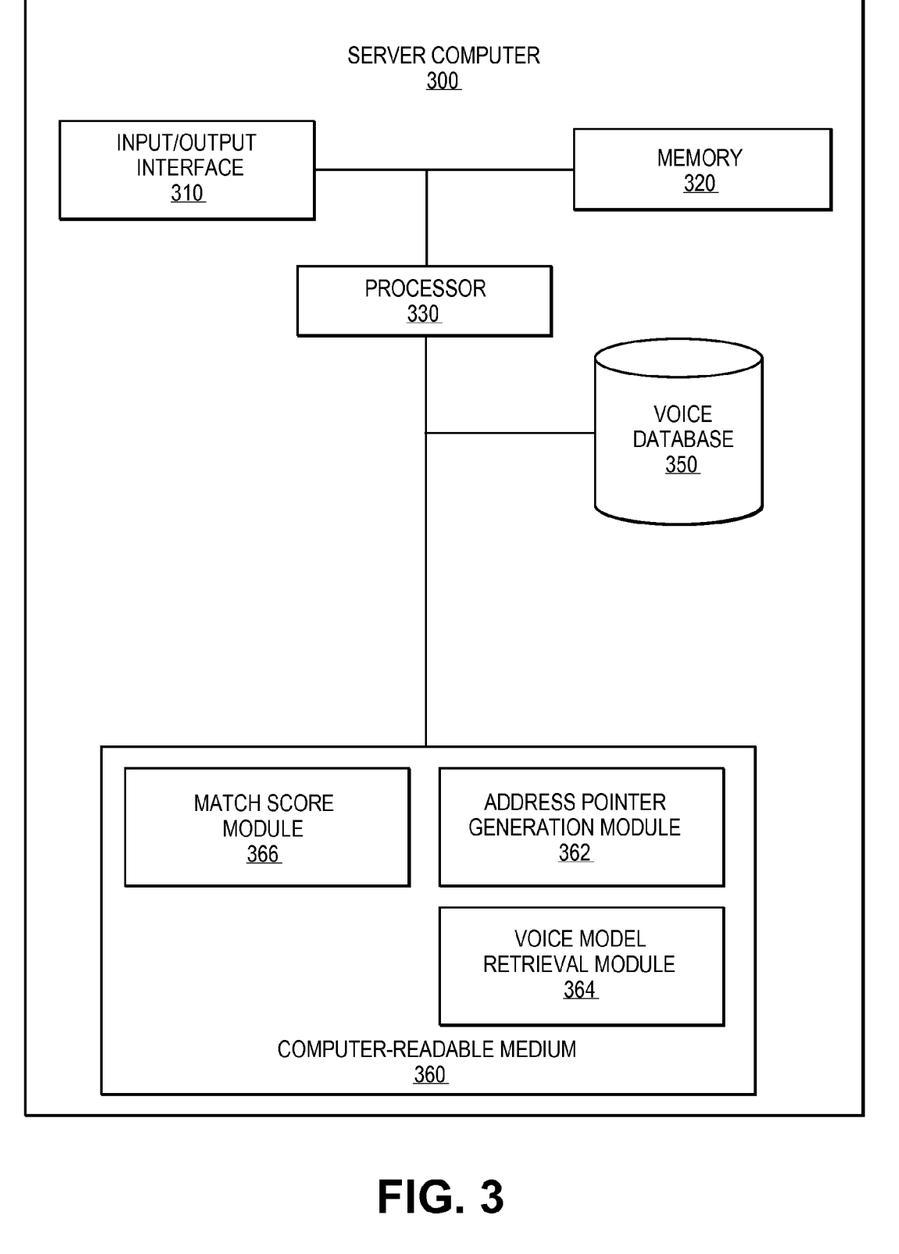
FIG. 3 is a block diagram of server computer, according to some embodiments.

FIG. 3 is a block diagram of a server computer 300, according to some embodiments of the present invention. Server computer 300 includes an input/output interface 310, a memory 320, a processor 330, a voice database 350, and a computer-readable medium 360. In some embodiments, the server computer 300 may reside within the interconnected network 160 (FIG. 1). In some embodiments, the server computer 300 may reside within the payment processor network 140 (FIG. 1).

The input/output (I/O) interface 310 is configured to receive and transmit data. For example, the I/O interface 310 may receive an authorization request message from the acquirer 130 (FIG. 1). The I/O interface 310 may also be used for direct interaction with the server computer 300. The I/O interface 210 may accept input from an input device such as, but not limited to, a keyboard, keypad, or mouse. Further, the I/O interface 310 may display output on a display device. The I/O interface 310 may also receive communications from the communication device 110 (FIG. 1), such as a voice sample from the user.

Memory 320 may be any magnetic, electronic, or optical memory. It can be appreciated that memory 320 may include any number of memory modules, that may comprise any suitable volatile or non-volatile memory devices. An example of memory 320 may be dynamic random access memory (DRAM).

Processor 330 may be any suitable processor operable to carry out instructions on the server computer 300. The processor 330 is coupled to other units of the server computer 300 including input/output interface 310, memory 320, voice database 350, and computer-readable medium 360.

The voice database 350 is configured to store voice model(s) of users. The voice model(s) of the users may be constructed from one or more prior voice samples received from the corresponding user. As subsequent voice samples are received from the user, the voice model may improve over time and the voice model data may more accurately represent the user's voice. The voice model(s) may also include attributes such as, but not limited to, time of the authentication/payment transaction, the user or payment cardholder's name, the voice data associated with the payment transaction, the outcome of payment cardholder verification/authentication, and a match score for the audio data. These attributes of the payment user's fraud profile are described in detail in FIG. 6.

Computer-readable medium 360 may be any magnetic, electronic, optical, or other computer-readable storage medium. Computer-readable storage medium 360 includes address pointer generation module 362, voice model retrieval module 364, and match score module 366. Computer-readable storage medium 360 may comprise any combination of volatile and/or non-volatile memory such as, for example, buffer memory, RAM, DRAM, ROM, flash, or any other suitable memory device, alone or in combination with other data storage devices.

Address pointer generation module 362 may be configured to generate a reference to a voice model stored within the voice database 350 upon an indication that the communication device 110 is within a certain location. In some embodiments, the location may be a merchant location. A virtual perimeter (e.g., geofence) may be established around the merchant location. Upon the communication device 110 entering the virtual perimeter, the server computer 300 may receive an indication and the address pointer generation module 362 may generate a reference to the voice model(s) associated with the user of the communication device 110 that is stored within the voice database 350. In some embodiments, the reference may be a pointer to the memory location where the voice model is stored within the voice database 350. In some embodiments, the reference may be a user id associated with the user, etc.

Voice model retrieval module 364 may be configured to use the reference generated by the address pointer generation module 362 to retrieve the voice model from the voice database 350. In some embodiments, retrieval of the voice model may include accessing the voice database 350 using the reference. In some embodiments, retrieval of the voice model may further include of copying the voice model from the voice database 350 to another location (described in further detail below).

Match score module 366 is configured to calculate a match score associated with captured voice data for each user voice authentication attempt using a provided voice sample. The match score may be based on a numeric score (e.g., between 0 and 100), where the score expresses a degree of confidence that the captured voice sample matches with previously captured and stored voice samples from the user, and ultimately that the user being authenticated is the genuine user. This score can be passed on to other parts of a risk scoring mechanism, such that the score, along with other risk parameters, contributes to the overall decision of approving or declining the transaction.

It can be appreciated that in some embodiments the server computer 200 may reside within the payment processing network 140 (FIG. 1) or issuer 150 (FIG. 1).

Figure 4:
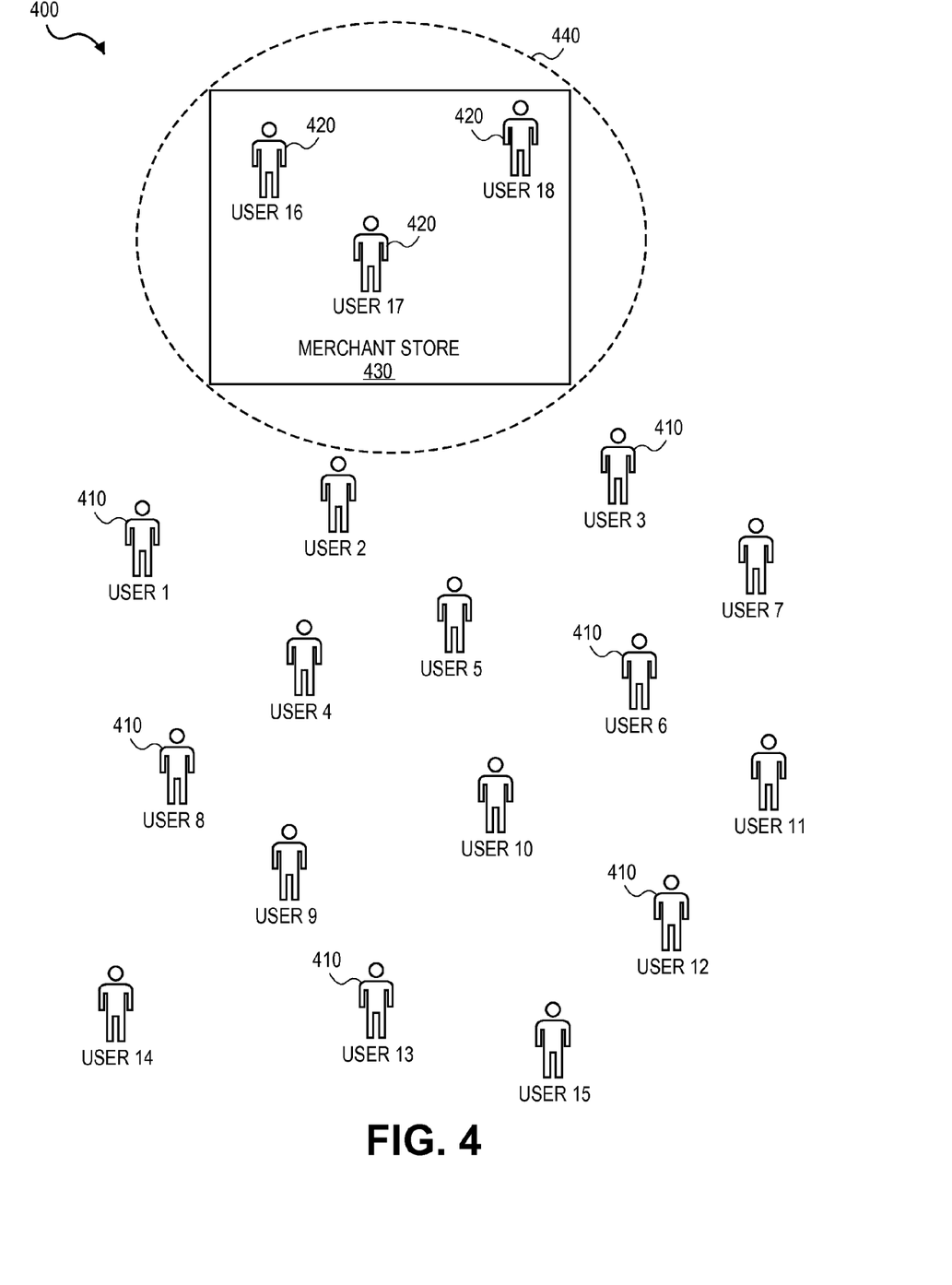
FIG. 4 illustrates an exemplary environment including a merchant location, according to some embodiments.

FIG. 4 illustrates an exemplary environment 400 including a plurality of users and a merchant location, according to some embodiments. The environment also includes a merchant store 430. The merchant store 430 may be any physical location of a merchant. For example, merchant store 430 may be a grocery store, shoe store, flower store, restaurant, coffee shop, etc. The plurality of users may include users 420 within the boundaries of merchant store 230 and users 410 outside the boundaries of merchant store 430. Each user 410, 420 may be carrying a communication device. The boundaries of the merchant store 430 may defined by a virtual perimeter 440, such as a geofence. In some embodiments, the virtual perimeter 440 may be established with the use of location-based hardware installed at merchant store 430. In some embodiments, the virtual perimeter 440 may be established via server-side implementation, e.g. by monitoring locations of the various communication devices and sensing when the communication device is within the virtual perimeter 440.

The techniques described herein provide speaker verification for authentication purposes through the communication device. More specifically, embodiments of the present invention pertain to transactions conducted with the use of a communication device, such as a mobile phone or personal computer, for in-person transactions at the merchant store 430. The speaker verification may be accomplished using any voice biometric techniques, for example, prompted text independent speaker verification.

The systems and methods described herein allow for location-awareness of the communication devices, and in turn the users 420, within merchant store 430. The location-awareness may be accomplished using techniques such as geofencing, where a virtual perimeter is created around the merchant store 430. When the location-aware communication device of a location-based service (LBS) user enters or exits a geo-fence, the communication device can receive a location notification (also referred to herein as a "geo-fence notice"). This location notification may contain information about the location of the device. The geo-fence notice can be sent to the payment processor network 140 (FIG. 1) or issuer 150 (FIG. 1). In some embodiments, the communication device may take an active role in the location-awareness and send a notification to the payment processor network 140 (FIG. 1) or issuer 150 (FIG. 1) when the communication device senses that it has entered or exited the virtual perimeter 440 around the merchant store 430.

Once the payment processor network 140 (FIG. 1) or issuer 150 (FIG. 1) receives the geo-fence notice, a reference to a voice model associated with the user within the boundaries of merchant store 430 may be retrieved. The voice model may be stored within voice database 350 (FIG. 3). The reference may be a reference pointer to the location of the user's voice model within the voice database 350 (FIG. 3). In some embodiments, searching through a large database of thousands or millions of voice models for the user's particular voice model may be time consuming, process intensive, and inefficient. The user's experience with the authentication system may be diminished as a result. As such, the geo-fencing techniques can greatly reduce the set of voice models that need to be searched to only users 420 that are within the virtual perimeter of the merchant store 430. Furthermore, by retrieving a reference to the voice models for the users within 420 the boundaries of the merchant store 430 as soon as the user enters the virtual perimeter, the voice model of the user can be retrieved while the user is still shopping to improve the checkout time at the POS. The reference to the voice model may be obtained when the user enters the merchant store 430 and the geo-fence notice is sent to the payment processor network 140 (FIG. 1) or the issuer 150 (FIG. 1). In some embodiments, the reference may be obtained on-the-fly at the time when the transaction is initiated by the user, or when the user enters the checkout area indicating the user is about to initiate the transaction.

For example, when user John Doe enters the merchant store 430 with his location-aware communication device, a geo-fence notice may be sent to the payment processor network 140 (FIG. 1) or issuer 150 (FIG. 1). Once the payment processor network 140 (FIG. 1) or issuer 150 (FIG. 1) verifies that John Doe is a user set up for voice authentication, a reference to John Doe's voice model within the voice database 350 (FIG. 3) may be retrieved. When John Doe is ready to initiate a transaction, he may interact with his communication device and respond to speaker verification prompts provided by the communication device. For example, John Doe may speak "My name is John," in response to a prompt displayed by the communication device. At this point, a reference to John Doe's voice model and the other users 420 within the merchant store 430 voice models may already be retrieved. As such, comparisons of John Doe's received voice input to the voice model in the voice database 350 (FIG. 3) may be completed efficiently as there may not be a large amount of voice models to search for and compare against. In some embodiments, the reference may be pointer to storage address within the voice database 350 (FIG. 3) where the voice model(s) are stored. In some embodiments, the voice model may be copied from the voice database 350 (FIG. 3) to a second database, as described in further detail below.

Figure 5:
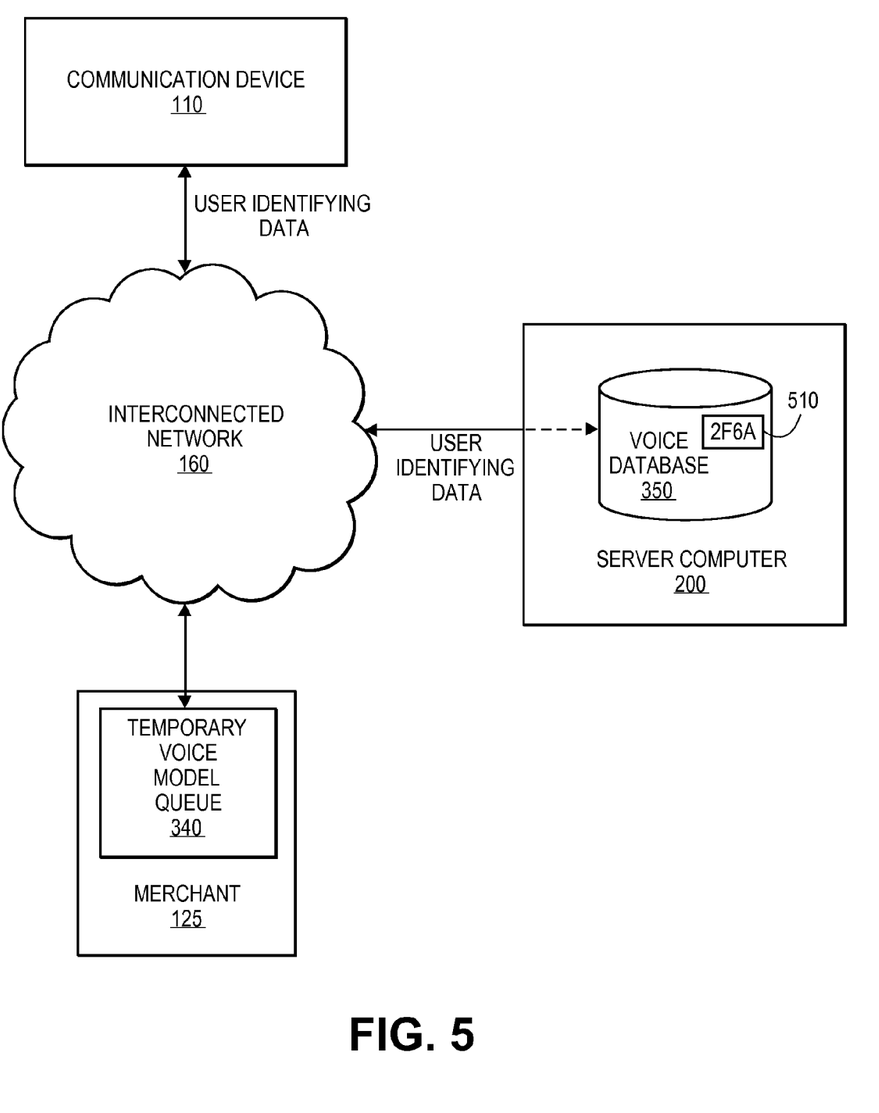
FIG. 5 illustrates a block diagram of accessing voice model within a voice database using reference, according to some embodiments.

FIG. 5 illustrates a block diagram of accessing voice model within a voice database 350 using a reference, according to some embodiments. The illustration in FIG. 5 depicts a communication device 110, server computer 200, and merchant 125. The communication device 110, server computer 200, and merchant 125 are interconnected via interconnected network 160. In some embodiments, the interconnected network 160 may be the Internet. As described above, the communication device 110 may be associated with a user and include location awareness functionalities. When the communication device 110 comes within the virtual perimeter 440 (FIG. 4), a notification may be sent to the server computer 350. The notification may be include user identifying data that may allow the server computer 200 to identify the user of the communication device 110. In some embodiments, the user identifying data may be sent via a digital wallet application associated with a digital wallet provider that runs on the communication device 110.

Upon receiving the notification, the server computer 200 may retrieve a reference to the voice model for the user stored within the voice database 350. In some embodiments, the reference may be a pointer to the storage location of the voice model within the voice database 350. For example, the voice model may be stored at address 2F6A within the voice database 350, and the reference may be a pointer to address 2F6A. In some embodiments, identification associated with the user (e.g., serial number, International Mobile Equipment Identity (IMEI) number, Subscriber Identity Module (SIM) card number, phone number, primary account number or token associated with a digital wallet application, etc.) may be mapped to the reference. The identification can then be used to retrieve the reference that points to the memory location (e.g., address 2F6A) within the voice database 350. Accordingly, the pointer may point to address 2F6A, which contains the voice model for the user within the voice database 350.

When the user initiates a transaction using communication device 110, the server computer 200 may have already retrieved the reference to the user's voice model stored within the voice database 350 (e.g., at the time the user entered the virtual perimeter 440 (FIG. 4)). Once the user provides a voice sample via the communication device 110, the communication device 110 may transmit the voice sample to the server computer 200 via the interconnected network 160. The server computer 200 may then authorize the user by comparing the received voice sample to the retrieved voice model of the user. Since the reference to the voice model may have already been retrieved, the server computer 200 may be able to quickly access the voice model and compare the received voice sample from the user. This may be in contrast to the server computer 200 having to search thousands or millions of entries in the voice database 350 to find the corresponding voice model associated with the user at the time of a transaction after the user has initiated the transaction. These techniques may result in increased authentication efficiency and improved user experience (e.g., reduce transaction processing at the POS).

In some embodiments, the server computer 200 may copy the user's voice model from the voice database 350 to a second database or queue. The second database or queue may be reside locally within or be associated with the merchant 125. For example, in FIG. 5, the temporary voice model queue 340 resides within the location of merchant 125. Upon receiving the notification that the communication device 110 is within the virtual perimeter 440 (FIG. 4), as described above, and after retrieving the reference to the user's voice model stored within the voice database 350, the server computer 200 may copy the voice model (using the retrieved reference) to the temporary voice model queue 340. This process may be done for each user's communication device 110 that is within the virtual perimeter 440 (FIG. 4). Accordingly, the temporary voice model queue 340 may contain copies of voice models for each user within the merchant store 430 (FIG. 4) at a given time. At the time the user is ready for checkout at the merchant store 430 (FIG. 4), the voice model for the user may already be available within the temporary voice model queue 340 local to the merchant 125. Accordingly, the access device 120 (FIG. 1) may have faster access to the voice model for the user within the temporary voice model queue 340. This may provide an efficient method to the authenticate the user at the time of the transaction.

In some embodiments, the voice database 350 may be associated with an entity outside of the payment processing network. For example, the voice database 350 may be associated with a mobile network operator. In such cases, the voice model associated with the user can be copied from the voice database 350 residing within the mobile network operator to a temporary voice model queue 340 residing within the payment processing network. This may allow for faster transaction authentication and authorization by copying the voice model to a database within the payment processor network.

Figure 6:
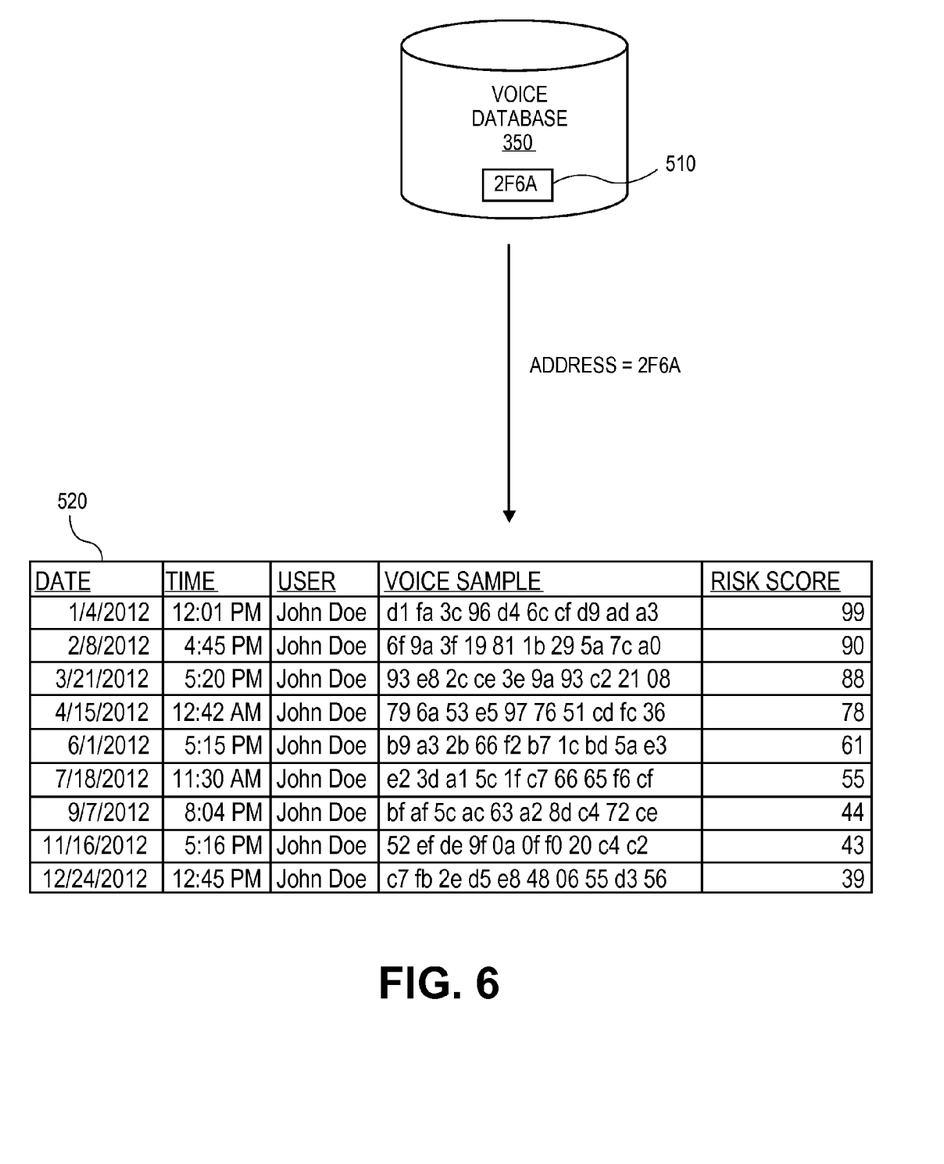
FIG. 6 shows an exemplary voice database including a voice model, according to some embodiments.

FIG. 6 shows an exemplary voice database 350 including a voice model 520 created from a plurality of voice samples, according to some embodiments of the present invention. The voice database 350 may include a voice model 520 with voice samples for each user. The voice samples may be stored previous voice inputs from the user during the course of a transaction authentication. The voice model 520 may include attributes such as, but not limited to, date of the payment transaction, time of the payment transaction, the payment user's name, the captured voice data used for verification and associated with the payment transaction, the outcome of payment user verification/authentication, and a variable match score for the user. The voice model 520 may represent a "signature" of the user's voice made up from prior received (and authenticated) voice samples. As more voice samples are received from the user, the voice model 520 may improve in accuracy.

The voice model 520 shows data sets relating to nine different payment authorization requests for a user named "John Doe." Each of the nine payment authorization request data sets includes the attribute information mentioned above. The combination of the nine data sets forms the voice model for John Doe.

The date attribute of the voice model 520 indicates the date at which a user initiated a payment transaction using the communication device. In this example, the first recorded date (Jan. 1, 2012) indicates the first payment transaction initiated by the user after enrollment with the system. Each subsequent date represents a subsequent payment transaction initiated by the user.

The time attribute of the voice model 520 indicates the time of day on the date at which the user initiated the particular payment transaction.

The user attribute of the voice model 520 indicates the registered name for the genuine user. In this example, the registered name, "John Doe" is the same for every payment authorization request. It can be appreciated that the voice model 520 stores the recorded payment authorization requests for each user in a unique storage location within the database. Other storage locations within the voice model 520, not shown in this example, may contain fraud profiles.

The voice sample data of the voice model 520 can be the captured digital representation of the voice signal by the communication device upon voice authentication of the user that is then sent to the voice biometric matching server. As mentioned above, in some embodiments, the voice data for each individual payment transaction request initiated by the user may be unique as well as the requested prompt (e.g., the sequence of words used in a particular authentication). In some embodiments, one or more specific prompt can be used more than once for authentication.

The voice model 520 shows nine different captured voice data representations for each of the nine payment transactions initiated by the user "John Doe." As shown, each of the voice data representations is unique. Since it may be unlikely that each received voice data representation from the user will be identical every time, the voice data representations may be unique for each transaction. For example, it may be unlikely that a user speaks in the same tone for the voice biometric every time or that the requested voice prompt is the same every time.

In this example, a first voice data representation (stored on Jan. 4, 2012) is generated upon a user performing their first payment authorization request after registering with the communication device. A second voice data representation is generated on a subsequent payment authorization request. If a received voice data representation is significantly different than previously received and stored voice data representations in the voice model 520, the received voice data representation may be assigned a relatively low match score and the payment transaction request may be denied for the possibility of a fraudster wishing to initiate the payment transaction request.

As more voice data representations are received and stored, more comparison points for subsequently received voice data representations are available. For example, the ninth received voice data representation (Dec. 24, 2012) may be compared against the previous eight stored voice data representations (or against a model generated from the collection of those eight voice data recordings) in order to determine its match score. Also, the voice data representations are used to create a voice model for the user. Each subsequent voice data representation received improves the user's voice model.

The risk score attribute of the voice model 520 indicates a risk score associated with the particular authentication request by the user. In this example, the risk score may be on a scale from 0-100, with 100 being the highest (most risk). The match scores may decrease over time as the user authenticates with the authentication system more and becomes more "trusted" over time.

As demonstrated in FIG. 6, the risk score varies for each subsequent payment transaction request initiated by user "John Doe." In some embodiments, a first transaction request may not have a risk score because it is the first received voice data representation used for initial enrollment by the user. Each subsequent received and validated voice data representation results may result in a lower risk score, as described above. The determination of the risk score may be determined based on a predetermined formula. The risk score may be an indication of how risky approving the payment transaction may be.

Figure 7:
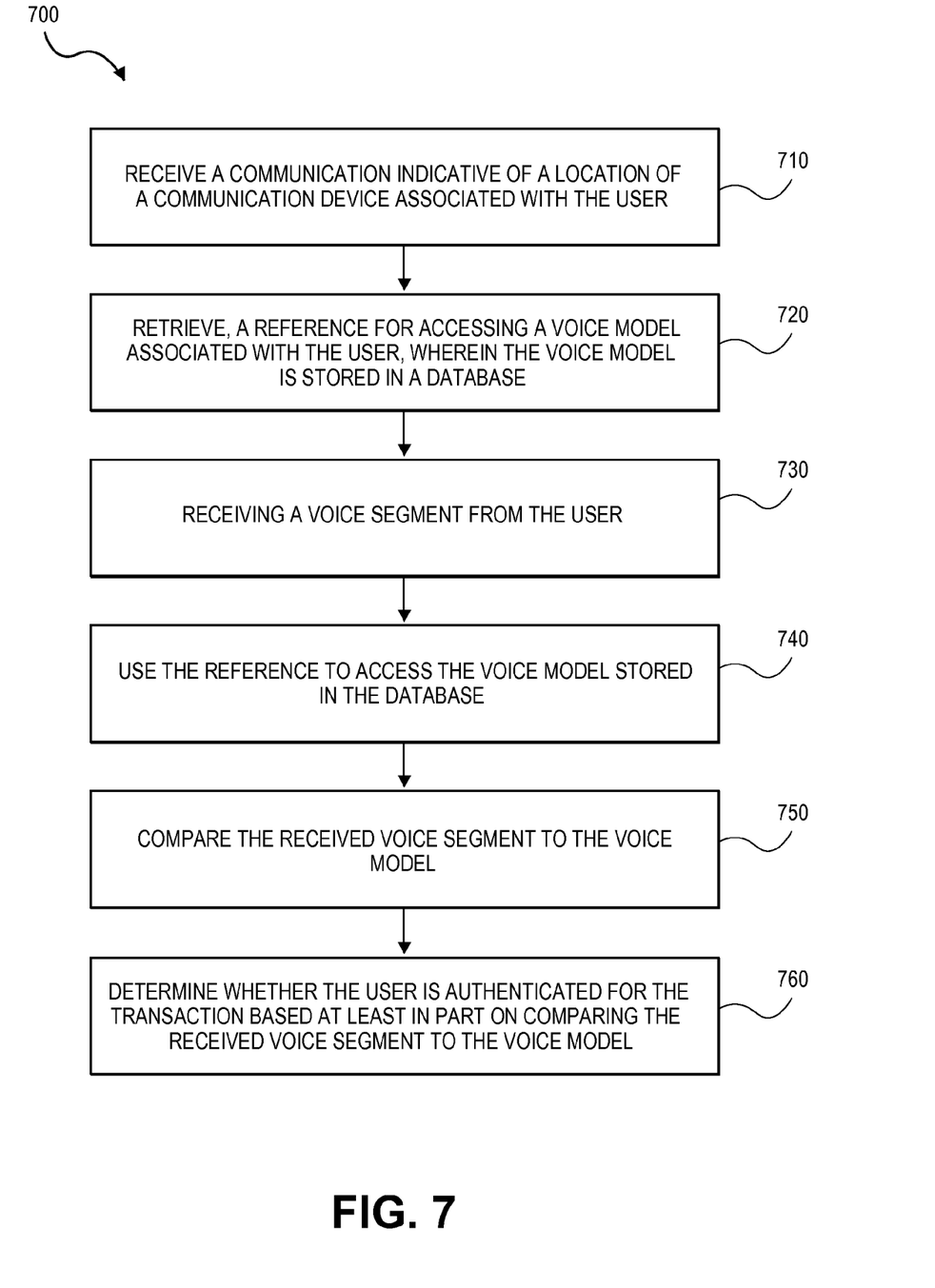
FIG. 7 illustrates a flow diagram of an exemplary method for authenticating a user for a transaction, according to some embodiments.

FIG. 7 is a flow diagram 700 of an exemplary method authenticating a user for a transaction, according to some embodiments of the present invention. In block 710, a communication indicative of a location of a communicative associated with the user is received. The location of the communication device may have been determined using location based services in combination with geo-fencing, as described above.

In block 720, a reference for accessing a voice model associated with the user is retrieved. The voice model may be stored in a database (e.g., a remote database). For example, if a user is determined to be within a store, based on the geo-fencing, a reference to the user's voice model stored within the voice database may be retrieved.

In block 730, a voice segment is received from the user. The voice segment may be received by the user's communication device via an internal or external microphone input. The voice segment may be in response to a prompted text speaker verification prompt.

In block 740, the reference is used to access the voice model stored in the database. The reference may be a pointer to the voice model.

In block 750, the received voice segment is compared to the voice model. For example, the received voice segment may be compared to the user's voice model within voice database by using the reference pointer to the location of the voice model within the database. This may allow for more efficient comparisons to be made.

In block 750, a determination is made whether the user is authenticated for the transaction based at least in part on the comparing step. If the received voice segment from the user matches the voice model in the voice database, the user may be authenticated to complete the transaction.

Figure 8:
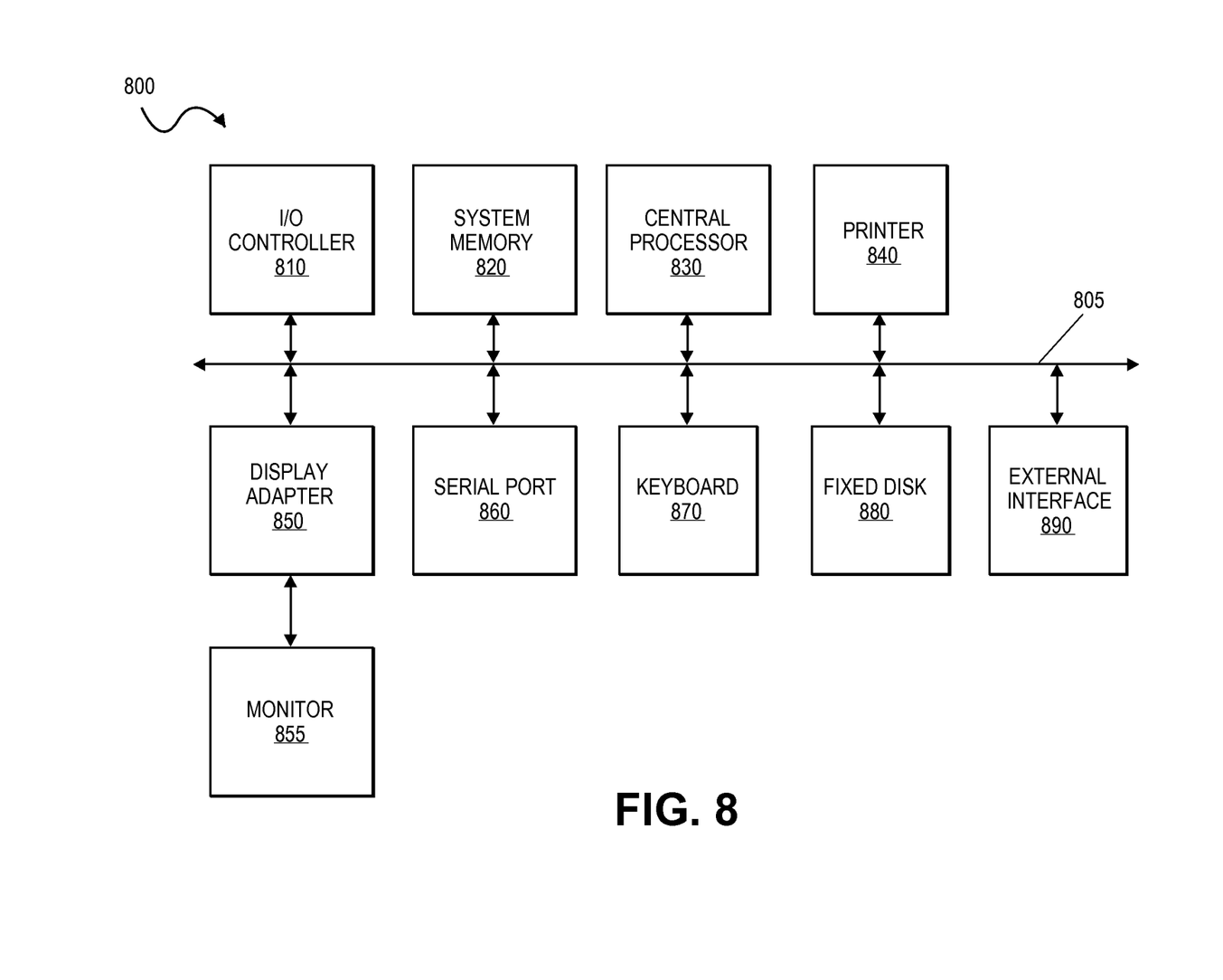
FIG. 8 shows a block diagram of an exemplary computer apparatus, according to some embodiments.

Referring now to FIG. 8, an exemplary computer system 800 according to one embodiment of the present invention is illustrated. The system 800 may be used to implement any of the computer systems described above (e.g., client computer, a server computer at the card association, a server computer at the issuer, a computer apparatus at the merchant, etc.). The computer system 800 is shown comprising hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). The computer system 800 may also include one or more storage devices 808. By way of example, the storage device(s) 808 can include devices such as disk drives, optical storage devices, solid-state storage device such as a random access memory ("RAM") and/or a read-only memory ("ROM"), which can be programmable, flash-updateable and/or the like.

The computer system 800 may additionally include a computer-readable storage media reader 812, a communications system 814 and working memory 818, which may include RAM and ROM devices as described above. The communications systems can include, for example, a modem, a network card (wireless or wired), an infra-red communication device, etc. In some embodiments, the computer system 800 can also include a processing acceleration unit 816, such as a digital signal processor (DSP), a special-purpose processor, and/or the like.

The computer-readable storage media reader 812 can further be connected to a computer-readable storage medium 810, together (and, optionally, in combination with storage device(s) 808) comprehensively representing remote, local, fixed, and/or removable storage devices plus storage media for temporarily and/or more permanently containing, storing, transmitting, and retrieving computer-readable information. The communications system 814 can permit data to be exchanged with the network and/or any other computer described above with respect to the system 800.

The computer system 800 may also comprise software elements, shown to be located within a working memory 818, including an operating system 820 and/or application programs 822 comprising code, such as a client application, Web browser, mid-tier application, RDBMS, etc. It should be appreciated that alternate embodiments of a computer system 800 can have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

Suitable speaker verification techniques that can be used in embodiments of the invention can also be found in U.S. patent application Ser. No. 13/899,496, filed on May 21, 2013 and U.S. patent application Ser. No. 13/899,470, filed on May 21, 2013, which are incorporated by reference in their entirety for all purposes.

What is claimed is:

1. A method of authenticating a user for a transaction, the method comprising:
receiving, at a server computer, a communication indicative of the communication device associated with the user entering a location within a virtual perimeter;
in response to receiving the communication and prior to receiving a voice segment from the user, retrieving, via the server computer, a reference for accessing a voice model associated with the user, wherein the voice model is stored in a database, wherein the reference is a pointer to a storage address within the database;
using, at the server computer, the reference to access the voice model stored in the database;
comparing, at the server computer, the received voice segment to the voice model;
determining, at the server computer, whether the user is authenticated for the transaction based at least in part on comparing the received voice segment to the voice model; and
transmitting, via the server computer and to a merchant computer, a result of the determining step.

2. The method of claim 1, wherein the database is a first database, the method further comprising:
using the reference, copying the voice model from the first database to a second database, wherein the voice model being compared with the received voice segment is retrieved from the second database.

3. The method of claim 1, wherein the comparing step further comprises determining a match score based at least in part on the comparison.

4. The method of claim 1, wherein the virtual perimeter is established around a merchant location.

5. The method of claim 1, further comprising updating the voice model with the received voice segment.

6. The method of claim 1, wherein the voice model is based on a plurality of voice segments previously received from the user.

7. The method of claim 1, further comprising:
calculating a match score based at least in part on comparing the received voice segment to the voice model; and
approving or declining the transaction based on the match score.

8. A server computer, comprising:
a processor; and
a non-transitory computer-readable storage medium, comprising code executable by the processor for implementing a method for authenticating a user for a transaction, the method comprising:
receiving a communication indicative of the communication device associated with the user entering a location within a virtual perimeter;
in response to receiving the communication and prior to receiving a voice segment from the user, retrieving a reference for accessing a voice model associated with the user, wherein the voice model is stored in a database, wherein the reference is a pointer to a storage address within the database;
using the reference to access the voice model stored in the database;
comparing the received voice segment to the voice model;
determining whether the user is authenticated for the transaction based at least in part on comparing the received voice segment to the voice model; and
transmitting, to a merchant computer, a result of the determining step.

9. The server computer of claim 8, wherein the database is a first database, the method further comprising:
using the reference, copying the voice model from the first database to a second database, wherein the voice model being compared with the received voice segment is retrieved from the second database.

10. The server computer of claim 8, wherein the comparing step further comprises determining a match score based at least in part on the comparison.

11. The server computer of claim 8, wherein the virtual perimeter is established around a merchant location.

12. The server computer of claim 8, further comprising updating the voice model with the received voice segment.

13. The server computer of claim 8, wherein the voice model is based on a plurality of voice segments previously received from the user.

14. The server computer of claim 8, further comprising:
calculating a match score based at least in part on comparing the received voice segment to the voice model; and
approving or declining the transaction based on the match score.

* * * * *